(12) United States Patent
Fang et al.

(10) Patent No.: US 10,187,196 B2
(45) Date of Patent: Jan. 22, 2019

(54) METHOD AND DEVICE FOR PROVIDING A GLOBAL CLOCK IN A SYSTEM

(71) Applicant: THE WUHAN DIGITAL PET CO., LTD, Hubei (CN)

(72) Inventors: Lei Fang, Hubei (CN); Bo Zhang, Hubei (CN)

(73) Assignee: THE WUHAN DIGITAL PET CO., LTD, Hubei (CN)

( * ) Notice: Subject to any disclaimer, the term of this patent is extended or adjusted under 35 U.S.C. 154(b) by 0 days.

(21) Appl. No.: 15/523,944

(22) PCT Filed: Oct. 23, 2015

(86) PCT No.: PCT/CN2015/092602
§ 371 (c)(1),
(2) Date: May 3, 2017

(87) PCT Pub. No.: WO2016/070719
PCT Pub. Date: May 12, 2016

(65) Prior Publication Data
US 2017/0338938 A1  Nov. 23, 2017

(30) Foreign Application Priority Data
Nov. 3, 2014 (CN) .......................... 2014 1 0610461.0

(51) Int. Cl.
*H04L 7/00* (2006.01)
*G06F 1/04* (2006.01)
(Continued)

(52) U.S. Cl.
CPC .............. *H04L 7/0037* (2013.01); *G06F 1/04* (2013.01); *G06F 1/12* (2013.01); *H04B 3/46* (2013.01);
(Continued)

(58) Field of Classification Search
CPC ......... G06F 1/10; H04J 3/0685; H04J 3/0688; H04J 3/0638; H04L 7/0008
(Continued)

(56) References Cited

U.S. PATENT DOCUMENTS

| 6,697,382 B1 | 2/2004 | Eatherton |
| 7,483,448 B2 | 1/2009 | Bhandari |

(Continued)

FOREIGN PATENT DOCUMENTS

| CN | 1667997 | 9/2005 |
| CN | 101459502 | 6/2009 |

(Continued)

OTHER PUBLICATIONS

"International Search Report (Form PCT/ISA/210)", dated Jan. 27, 2016, with English translation thereof, pp. 1-4.
(Continued)

*Primary Examiner* — Zewdu A Kassa
(74) *Attorney, Agent, or Firm* — JCIPRNET (57) ABSTRACT

A method and a device for providing a global clock in a system, the terminals in the system are channel connected to each other via paths, each terminal is communicatively connected to a clock source ultimately via a signal recording unit, respectively, the clock source sends a calibration signal to the network, the signal recording unit records the current transmitting time T (0) of the calibration signal, each terminal will receive the calibration signal sequentially due to different distances from the clock source and will return the signal, the backward signals are returned to the signal recording unit along the network sequentially, and the signal recording unit records the time T (n) of each backward signal sequentially, in this way, the signal recording unit can then measure the delay between each terminal and the clock source signal, which can be used as a correction parameter (Continued)

to ensure that all terminals are in exactly the same time reference, in addition, in this way, there is no need to control the length of the clock cables from each terminal to the clock source, and no special consideration is required for clock routing, and difficulties in system assembly, calibration, maintenance and expansion brought by large amounts of cable are avoided.

20 Claims, 4 Drawing Sheets

(51) Int. Cl.
  *G06F 1/12* (2006.01)
  *H04B 3/46* (2015.01)
  *H04J 3/06* (2006.01)
  *H04L 7/10* (2006.01)
(52) U.S. Cl.
  CPC .......... *H04J 3/0638* (2013.01); *H04L 7/0008* (2013.01); *H04L 7/10* (2013.01); *H04J 3/0682* (2013.01)
(58) Field of Classification Search
  USPC .......................... 375/356, 354, 316, 295, 219
  See application file for complete search history.

(56) References Cited

U.S. PATENT DOCUMENTS

| | | |
|---|---|---|
| 8,279,897 B2 | 10/2012 | Lee |
| 2003/0040328 A1 | 2/2003 | Indirabhai |
| 2005/0201421 A1* | 9/2005 | Bhandari .............. H04J 3/0682 370/519 |
| 2009/0222589 A1 | 9/2009 | Kirsch et al. |
| 2011/0066740 A1 | 3/2011 | Campagna |
| 2011/0216660 A1* | 9/2011 | Lee ........................ H04J 3/06 370/252 |
| 2013/0094523 A1* | 4/2013 | Shen .................... H04J 3/0658 370/503 |

FOREIGN PATENT DOCUMENTS

| | | |
|---|---|---|
| CN | 103297216 | 9/2013 |
| CN | 103812589 | 5/2014 |
| CN | 104320240 | 1/2015 |
| JP | H11211863 | 8/1999 |
| JP | 2007189457 | 7/2007 |
| WO | 2009076908 | 6/2009 |
| WO | 2014077717 | 5/2014 |
| WO | 2014078818 | 5/2014 |

OTHER PUBLICATIONS

"Written Opinion of the International Searching Authority (Form PCT/ISA/237)" of PCT/CN2015/092602, dated Jan. 27, 2016, pp. 1-11.

"Search Report of Europe Counterpart Application", dated May 17, 2018, p. 1-8.

"Office Action of Japan Counterpart Application", dated May 8, 2018, p. 1-12.

* cited by examiner

METHOD AND DEVICE FOR PROVIDING A GLOBAL CLOCK IN A SYSTEM

CROSS-REFERENCE TO RELATED APPLICATION

This application is a 371 of international application of PCT application serial no. PCT/CN2015/092602, filed on Oct. 23, 2015, which claims the priority benefit of China application no. 2014106104610, filed on Nov. 3, 2014. The entirety of each of the above-mentioned patent applications is hereby incorporated by reference herein and made a part of this specification.

FIELD

The present disclosure belongs to the technical field of time test and measurement, which relates generally to a method for determining a reference time, and more particularly, to method for determining a global time.

BACKGROUND

Figure 1:
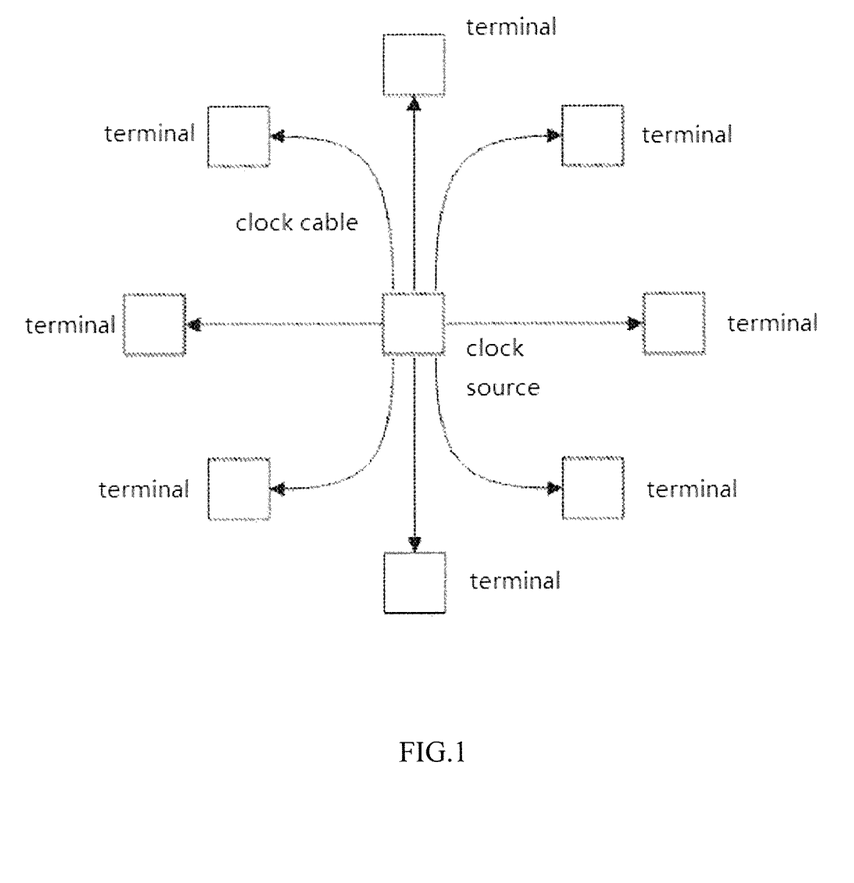
FIG. 1 is a structural schematic diagram of a global clock determining device for a conventional star network structure.

The global clock is used in multiple areas to ensure that each component in the system has exactly the same time reference. For example, in the field of nuclear detection and flight time applications, multiple terminal systems often require a fully consistent time reference to meet the need of accurate time measurements. The method for obtaining and correcting the communication delay by way of timestamp communication between plurality of terminals is widely used in the field of communication, but this synchronization method is limited to the use of the existing communication protocol to achieve a global clock synchronization with a low accuracy, such as ms or sub-ms level. The accuracy of this method ultimately depends on the speed of the clock, that is, toggle frequency, and would not achieve a synchronization accuracy shorter than clock cycle. Therefore, the traditional method can only be, as shown in FIG. 1, setting in the system a unique clock source, and then connecting all the terminals needing for clock to the clock source, building a star network, and accurately ensuring that all connections (from the clock source to each terminal) have exactly the same length, thus ensuring that each terminal can obtain exactly the same synchronous clock signal. In this way, this requires special consideration of clock routing in complex systems consisting of very large-scale terminals, and a large amount of cable brings difficulties in system assembly, calibration, maintenance, and expansion. For example, if a new terminal is required, then it is necessary to add a fan-out at the clock source by a traditional method, which will necessarily change the hardware that has already been determined. Furthermore, in particular field, such as a scanning imaging system, as a plurality of (several to several thousands) detectors (i.e., terminals) all require a uniform time reference to satisfy a globally harmonized clock, and each detector requires a time measuring device at picosecond (ps) level, which makes the entire instrument system require a higher time resolution and the accuracy of the synchronization for time be required at the ps level, therefore, the equal length of the cable is required at the micron (um) level, which is too strict for the existing global clock to meet.

SUMMARY

An object of the present disclosure is to provide a method and a device for providing a global clock in a system, and the method and the device ensure that all the terminals are in a fully consistent time reference by determining a delay from the clock source to a terminal, and using the delay as a calibration parameter. By use of high-precision signal recording unit, the precise measurement of the delay from the clock source to the terminal can be achieved; in addition, the high level of toggle frequency of the clock source is not required, so that it can be used in the occasions where high-precision synchronization is required. At the same time, in the method and the device for providing a global clock in a system according to the present disclosure, there is no need to control the length of the clock cable from each terminal to the clock source, and no special consideration is required for clock routing, thus avoiding the difficulties on system assembly, calibration, maintenance, expansion brought by large amount of cables.

In order to achieve the above objects, the following solutions are provided.

The present disclosure provides a method for providing a global clock in a system, the system including at least two terminals which are connected via paths, the method including the following steps.

(1) Generating a calibration signal which is then distributed to each terminal in the system, and recording the transmitting time T(0) of the calibration signals;

the method further including, before the step (1), the step of determining a clock source to be a reference clock source, a calibration signal is generated from the reference clock source;

preferably, the clock source is a timer control unit, or it includes a timer control unit and a clock generator being controlled by the timer control unit;

preferably, the calibration signal is formed by an electrical pulse directly generated by the timer control unit, or a clock signal generated by the clock generator driven by the timer control unit;

preferably, the reference clock source is a local clock within any of the terminals or an external clock source;

preferably, in the step (1), the transmitting time T(0) of the calibration signal is recorded by an signal recording unit cooperating with the reference clock source;

furthermore, in the step (1), the calibration signal was distributed to each terminal in the system by the signal recording unit cooperating with the reference clock source;

preferably, the reference clock source and the signal recording unit cooperating with the reference clock source belong to one of the terminals;

preferably, the minimum time measurement scale of the signal recording unit is less than ½ of the clock period of the reference clock source;

preferably, the minimum time measurement scale of the signal recording unit is within 1 ns.

(2) Recording an arrival time T(n) of a backward signal, the backward signal being generated at each of the terminals upon the arrival the calibration signal at each of the terminals, and determining an absolute deviation Delay (n) of each of the terminals;

preferably, the arrival time T (n) of the return signal is received and recorded by a signal recording unit cooperating with the reference clock source;

preferably, the backward signal an acknowledgement signal transmitted from each of the terminals respectively, or a returned calibration signal;

preferably, (I) if the return signal is a returned acknowledgement signal, Delay(n)=(T(n)−T(0)−Δn)/2, wherein Δn is the response time of each terminal;

(II) if the return signal is a returned calibration signal, Delay(n)=(T(n)−T(0))/2.

Preferably, in the step (1), Δn is system defaults; or Δn is determined by the signal recording unit in each terminal, when each terminal received the calibration signal, the signal recording unit in each terminal records the time as $t_{n1}$, when each terminal sent an acknowledgement signal respectively, the signal recording unit in each terminal records the time as $t_{n2}$, and the $\Delta n = t_{n2} - t_{n1}$.

(3) Adjusting the time at each terminal according to the absolute deviation to form a global clock.

Preferably, in the step (3), the absolute deviation of each terminal is determined by the signal recording unit or the processor of the terminal or an external processor, and the time at each terminal is adjusted to form a global clock.

At the same time, the present disclosure also provides a device for providing a global clock in a system, including: at least one clock source, at least two terminals which are connected via paths, and a signal recording unit cooperating with the clock source; the signal recording unit being connected via paths with the clock source, each of the terminals is in communication with the clock source via the signal recording unit to determine the absolute time deviation from each terminal to the clock source.

Preferably, the terminals are communicatively connected sequentially to form linear network structures, and the signal recording unit cooperating with the clock source is communicatively connected to a terminal in the linear network structures.

Furthermore, the signal recording unit cooperating with the clock source is communicatively connected to a terminal located at the end point in the linear network structures.

Furthermore, the connections between the terminals, and that between the signal recording unit and the terminals are two-way communicative connections.

Furthermore, the connections between the signal recording unit and the clock source, the connections between the signal recording unit and the terminals, and the connections between the terminals are wired connections.

Furthermore, each of the terminals is provided with a signal recording unit to determine the response time of each terminal.

Furthermore, at least one linear network is provided.

Preferably, each of the terminals is communicatively connected to the signal recording unit, respectively, to form a star network structure.

Furthermore, the connections between each of the terminals and the signal recording unit are two-way communicative connections.

Furthermore, the connections between the clock source and the signal recording unit, and that between the signal recording unit and each of the terminals are wired connections.

Furthermore, each of the terminals is provided with a signal recording unit to determine the response time of each terminal.

The minimum time measurement scale of the signal recording unit is less than ½ of the clock period of the reference clock source.

Preferably, the signal recording unit includes a controller, and a time converter communicatively connected to the controller so as to be driven by it, the time converter having a time accuracy within 1 ns.

Preferably, the time converter is TDC or TAC with a time accuracy within 100 ps.

As a result of the above-mentioned solution, the flowing advantageous effects are achieved.

1. According to the method and device for providing a global clock in a system disclosed by the present disclosure, the terminals in the system are connected to each other via paths, each terminal is connected to a predetermined clock source ultimately through a signal recording unit via different paths, respectively. The clock source sends a calibration signal to the network, the signal recording unit records the current transmitting time T(0) of the calibration signal, each terminal connected to the network will receive the calibration signal sequentially due to different distances from the clock source and will return the signal (it can be an active return of the calibration signal or a passive return by each terminal by way of sending a acknowledgement signal as its response), the backward signals are returned to the signal recording unit sequentially along the network, and the signal recording unit records the time T (n) of each backward signal sequentially. In this way, the signal recording unit can then measure the delay between each terminal and the clock source signal, which can be used in actual system as a correction parameter to ensure that all terminals are in exactly the same time reference.

2. The synchronization accuracy of time is improved by adding the high-precision signal recording unit. A high-precision signal recording unit (the minimum time measurement scale of the signal recording unit is less than ½ of the clock period of the reference clock source), such as a time-to-digital converter (TDC) or a time-to-analog converter (TAC), is provided at the clock source. When the time-to-digital converter (TDC) or time-to-analog converter (TAC) is used to determine the sending and return time of the signals, the absolute time deviation between each terminal and the clock source can be accurately determined to form a global clock. TDC, for example, is able not to rely entirely on the master clock frequency, and dose the timing by a circuit delay catch-up circuit, and is able to measure the length of time which is shorter than the clock cycle, and its timing accuracy can reach 10 ps. This can meet the requirements when the time synchronization accuracy is required at ps level and can be applied to occasions where the time accuracy is required at a high level.

3. There is no need to control the length of clock cable; connections in any way are allowed, and the networks between the terminals can be connected in any way, only if each terminal is communicatively connected with the clock source ultimately through the signal recording unit. In this way the global clock deployment can be completed, solving the difficulties in design and implement in traditional methods due to the requirement for precise connection length.

4. The scalability is increased. When a global clock device in a linear topological structure is used, the system expansion can be completed easily and simply by adding a terminal and a connection at one end of the linear network, without changing the hardware of the clock source or increasing the fan out of the clock source; when a global clock device in a star topology structure is used, although it is necessary to add a fan-out interface of the clock source when adding a terminal, there is no need for consideration and strict control for keeping the length of clock cable for the new terminal in perfect consistent with the terminals that have been previously accessed.

5. The amount of cable may be largely reduced. When a global clock device in a linear topology is used, a global clock can be achieved by just connecting all the terminals in series with a group of cable, it can solve the problem that the system assembly and maintenance become extremely difficult due to a large amount of cable when there are hundreds or thousands of terminals.

DETAILED DESCRIPTION OF THE PREFERRED EMBODIMENTS

The disclosure will now be further described with reference to the accompanying drawings.

Figure 2:
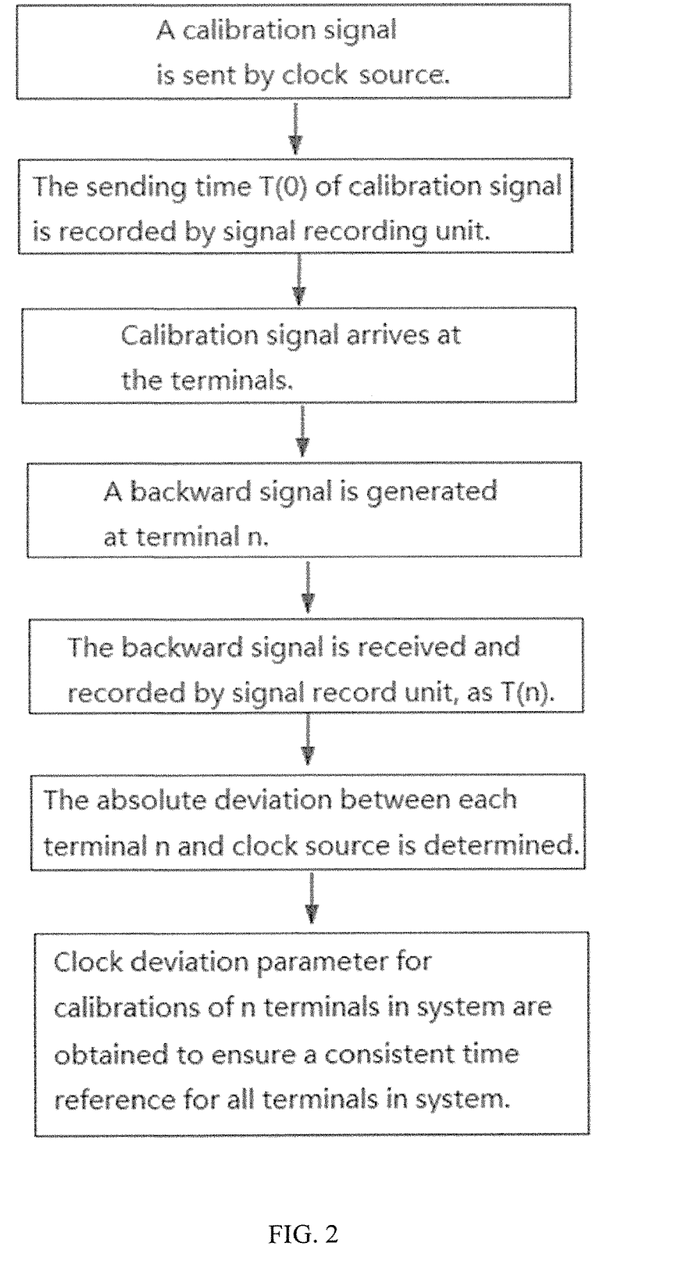
FIG. 2 is a flow diagram of the method for providing a global clock in a system shown in the present disclosure.

A method for providing a global clock in a system, as shown in FIG. 2, comprising the following steps:

First, determine a reference clock source, by which a calibration signal is generated. There can be multiple clock sources or a unique clock source in one system. When there are multiple clock sources, it is necessary to determine one of the clock sources as reference first. The reference clock source can be selected arbitrarily, just to ensure that the clock source can transmit through the network to all terminals (that is, cover all terminals). In addition, an external clock source can also be used as the reference clock for the entire system. The clock source mentioned above may be a single timer control unit or it may include a timer control unit and a clock generator being controlled by the timer control unit, which can be arbitrarily set according to actual needs.

(1) Generating a calibration signal which is then distributed to each terminal in the system, and recording the transmitting time $T(0)$ of the calibration signal.

In the embodiment shown in FIG. 2, when the reference clock source is determined, the clock source generates a calibration signal, and the specific form of the calibration signal is determined by the clock source. In the present embodiment, the calibration signal can be formed as an electrical pulse directly issued by the timer control unit, or a clock signal generated by the timer control unit. The calibration signal is then distributed to each terminal after it is generated, and the transmitting time $T(0)$ of the calibration signal is recorded when it is distributed.

(2) Recording an arrival time $T(n)$ of a backward signal, the backward signal being generated at each of the terminals upon the arrival the calibration signal at each of the terminals, and determining an absolute deviation Delay(n) of each of the terminals.

The form of the return signal can be varied; taking the backward signal being an acknowledgement signal or a calibration signal as an example, the operation principle of the method for providing a global clock in a system as shown in the present disclosure will be described below. It will be appreciated that the method of the present disclosure may also be used to implement a global clock for terminals in a system if the backward signal is in other forms.

When the calibration signal arrives at each of the terminals, each terminal can return the calibration signal by connecting with the backward signal link through a direct circuit, or receive the calibration signal via a controller (such as a controller that supports an asynchronous response like FPGA) and send an acknowledgement signal immediately (under the condition that it is not dependent on the master clock of the controller). After the backward signal is sent, the arrival time $T(n)$ of the backward signal is recorded, and the absolute deviation Delay (n) from each terminal to the reference clock source is determined.

The above-mentioned transmitting time $T(0)$ of the calibration signal and the arrival time $T(n)$ of the backward signal are received and recorded by a same timing element so that the two may have an accuracy in the same order of magnitude. In the embodiment shown in FIG. 2, the specific time is accepted and determined by the signal recording unit cooperating with the clock source, wherein the signal recording unit includes a controller and a time converter driven by the controller, and $T(0)$ and $T(n)$ is recorded by the time converter driven by the controller, and in step (1), the calibration signal may be distributed directly to each terminal by the control of the clock source, or may also be distributed to each terminal by the signal recording unit cooperating with the reference clock source.

(I) When the acknowledgement signal is returned in the form of response by the terminal, the arrival time $T(n)$ of the calibration signal is recorded by the signal recording unit cooperating with the reference clock source. Since it will take a certain time for the terminals to make the response, the absolute deviation Delay (n) of each terminal is determined as Delay(n)=$(T(n)-T(0)-\Delta n)/2$, wherein $\Delta n$ is the response time of each terminal. Since the acknowledgement signal can be an electrical pulse, when the method for providing a global clock in a system shown in the present disclosure is used in occasions where time accuracy is not required at a high level, $\Delta n$ is a default value which can be predetermined by experiment and calculation, and the length of the cable between the terminal and the clock source may be calculated as L (n)=Delay (n)*C, wherein C is the transmission speed of the signal in the line, close to the speed of light.

(II) When the backward signal is returned as a form of calibration signal, the arrival time $T(n)$ of the calibration signal is recorded by the signal recording unit cooperating with the reference clock source, and the absolute deviation Delay (n) of each terminal is Delay(n)=$(T(n)-T(0))/2$, and the length of the cable between the terminal and the clock source may be calculated as L (n)=Delay (n)*C, wherein C is the transmission speed of the signal in the line, close to the speed of light.

In this way, the absolute deviations for all the terminals in the system from the clock source are obtained.

(3) The time at each terminal is adjusted according to the absolute deviation to form a global clock. When all the terminals in the system are required to have a completely uniform time reference, a complete synchronization for the timing system of each terminal can be ensured by using the time differences (absolute deviations) calculated above as the correction coefficient. In step (3), an instruction may be sent via the signal recording unit or the processor of each terminal or the external processor according to the absolute deviation of each terminal to adjust the time at each terminal to form a global clock.

With the steps of the embodiment shown in FIG. 2, it is convenient to realize that all terminals in the system are in a perfectly consistent time reference, and there is no need to consider the problem of the routing from the terminals to the clock source. On the basis of the embodiment shown in FIG. 2, the present disclosure further discloses a method for providing a global clock in a system, which can improve the accuracy of time synchronization for use in the occasions where the time accuracy is required at a high level.

A method for providing a global clock in a system includes the following steps.

First, determine a reference clock source, by which a calibration signal is generated. There can be multiple clock sources or a unique clock source in one system. When there are multiple clock sources, it is necessary to determine one of the clock sources as a reference first, the reference clock source can be selected arbitrarily, just need to ensure that the clock source can transmit through the network to all terminals (that is, cover all terminals). In addition, an external clock source can also be used as the reference clock for the entire system, the clock source mentioned above can be a single timer control unit or it may include a timer control unit and a clock generator being controlled by the timer control unit, it can be set in any way according to actual needs.

(1) Generating a calibration signal which is then distributed to each terminal in the system, and recording the transmitting time T(0) of the calibration signal.

When the reference clock source is determined, the clock source generates a calibration signal, and the specific form of the calibration signal is determined by the clock source. In the present embodiment, the calibration signal can be formed as an electrical pulse directly issued by the timer control unit, or a clock signal generated by the timer control unit. The calibration signal is then distributed to each terminal after it is generated, wherein the calibration signal may be distributed directly to the terminals by the control of the clock source, or may also be distributed to each terminal by the signal recording unit cooperating with the reference clock source.

When the calibration signal is distributed, the transmitting time T(0) of the calibration signal is recorded by the signal recording unit cooperating with the clock source, wherein the minimum time measurement scale of the signal recording unit cooperating with the clock source is less than ½ of the clock period of the reference clock source so that the signal recording unit can accurately measure a period of time which is shorter than one clock cycle: in a global clock required for high synchronization, the global clock frequency is generally above 50 MHz, the clock period is within 20 ns, and the frequency may even reach 200 MHz or more, and the clock period is within 2 ns. But the delay in the line for the global clock also needs to be accurately measured, however, this delay varies with the length of the cable, and will not maintain the same phase as the system global clock. In order to accurately measure this delay, a high-precision clock measuring device is required, rather than relying on the global clock, higher-precision time measurement such as line delay or phase deviation can be achieved by the signal measuring device whose minimum measurement scale is less than ½ of the clock period of the reference clock.

As a preferred solution, the signal recording unit includes a controller and a time converter driven by the controller, the minimum measurement scale of the time converter is within 1 ns so that the transmitting time T(0) of the calibration signal and the return time T(n) of the backward signal can be accurately recorded, so that it can be used to the occasions where time accuracy is required at ps level.

Furthermore, the time converter may be a TDC (time-to-digital converter) or a TAC (time-to-analog converter) with a time accuracy within 100 ps. TDC, for example, read the counting value of TDC (time value recorded) under the control of the controller. Since TDC works by asynchronous timing, that is, the clock signal is instantly triggered, jump edge trigger of electric pulse usually, so there is no communication overhead. Furthermore, TDC is able not to rely entirely on the master clock frequency, and performs timing by a circuit delay catch-up circuit, its timing accuracy can reach 10 ps. Thus, by using the signal recording unit with a time accuracy within 100 ps to record the transmitting time and the return time of the signal, the requirements can be met when the time synchronization accuracy is required at ps level, and thus can be applied to the fields where time accuracy is required at a high level, such as a scanning imaging system.

In addition, in view of structure simplification, the reference clock source and the signal recording unit cooperating with the reference clock source may belong to one of the terminals in the system, and the clock source and the signal recording unit may share one processor.

(2) Receiving a backward signal and recording an arrival time T(n) of the backward signal, the backward signal being generated at each of the terminals upon the arrival the calibration signal at each of the terminals, and determining an absolute deviation Delay(n) of each of the terminals.

The form of the return signal can be varied. Taking the backward signal being an acknowledgement signal or a calibration signal as an example, the operation principle of the method for providing a global clock in a system as shown in the present disclosure will be described below. It will be appreciated that the method of the present disclosure may also be used to implement a global clock for the terminals in a system if the backward signal is in other forms.

When the calibration signal arrives at each of the terminals, each terminal may return the calibration signal by connecting with the backward signal link through a direct circuit, or receive the calibration signal via a controller such as a controller that supports an asynchronous response like FPGA and send an acknowledgement signal immediately (under the condition that it is not dependent on the master clock of the controller). After the backward signal is sent, the arrival time T(n) of the backward signals is received and determined by the signal recording unit cooperating with the clock source.

(I) When the backward signals are returned as a form of response by the terminals, the arrival time T(n) of the calibration signal is recorded by the signal recording unit cooperating with the reference clock source. Since it will take a certain time for the terminals to make the response, the absolute deviation Delay(n) of each terminal is determined as Delay(n)=(T(n)−T(0)−Δn)/2, wherein Δn is the response time of each terminal. In order to ensure that the Δn value has an accuracy which is in the same order of magnitude as T(0) and T(n), a signal recording unit is also set in each terminal, which is communicatively connected with each terminal, the clock source and the signal recording unit cooperating with the clock source via the network, and Δn is determined by the signal recording unit in each terminal. When each of the terminals received the calibration signal, the signal recording unit in each terminal records the time as $t_{n1}$. When each of the terminals sent acknowledgement signal respectively, the signal recording unit in each terminal records the time as $t_{n2}$, and the $\Delta n = t_{n2} - t_{n1}$, and the length of the cable between the terminals and the clock source may be calculated as L(n)=Delay (n)*C, wherein C is the transmission speed of the signal in the line, close to the speed of light.

(II) When the backward signals are in the form of returned calibration signal, the arrival time T (n) of the calibration signal is recorded by the signal recording unit cooperating with the reference clock source, then the absolute deviation Delay (n) of each terminal is Delay(n)=(T(n)−T(0))/2, and the length of the cable between the terminals and the clock source may be calculated as L (n)=Delay (n)*C, wherein C is the transmission speed of the signal in the line, close to the speed of light.

In this way, the absolute deviations for all the terminals in the system from the clock source are obtained.

(3) The time at each terminal is adjusted according to the absolute deviation to form a global clock. When all the terminals in the system are required to share a completely uniform time reference, complete synchronization for the timing system of each terminal can be ensured just by using the time differences (absolute deviations) calculated above as the correction coefficient. In step (3), an instruction may be sent via the signal recording unit or the processor of each terminal or the external processor according to the absolute deviation of each terminal to adjust the time at each terminal to form a global clock.

In the above-described method for providing a global clock in a system, by using the signal recording unit whose minimum measurement scale is less than ½ of the clock period of the reference clock source to determine the transmitting time T(0) of the calibration signal and the arrival time T (n) of the backward signal, the synchronization accuracy of the global clock in the system can be achieved, and there is no need to consider the problem of routing.

Figure 3:
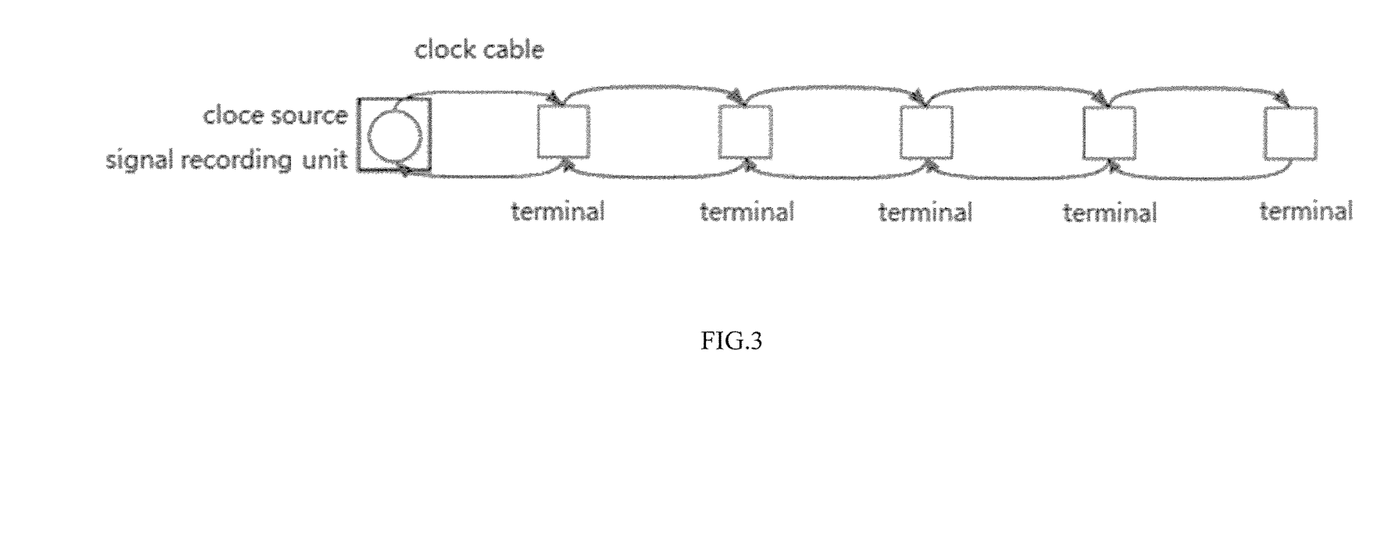
FIG. 3 is a structural schematic diagram of a first embodiment of the device for providing a global clock in a system shown in the present disclosure.

In addition to the statement mentioned above explicitly, it should be appreciated that with reference to the embodiment method shown in FIGS. 2 and 3, the steps shown may be in a different order in other exemplary embodiments. Similarly, in the embodiment shown in FIGS. 2 and 3, certain steps may be omitted or completed by other known techniques, and are not enumerated here.

Corresponding to the above-mentioned method for providing a global clock method in a system, the present disclosure also discloses a device for providing a global clock in a system which includes: at least one clock source, at least two terminals and a signal recording unit cooperating with the clock source, the terminals are connected to each other via paths, the signal recording unit and the clock source are communicatively connected, and each of the terminals are in communication with the clock source via the signal recording unit to determine the absolute deviation from each terminal to the clock source.

The terminals are connected to the clock source ultimately by the signal recording unit, At the time of initialization, the clock source sends a calibration signal to the network, the signal recording unit records the current transmitting time T (0) of the calibration signal, the terminals connected to the network will receive the calibration signal sequentially due to different distances from the clock source, and will return the signal (it can be an active return or a passive return), the returned signals (i.e. calibration signal or acknowledgement signal) are returned to the signal recording unit along the network sequentially, and the signal recording unit records the time T (n) of each backward signal. In this way, the signal recording unit can then measure the delay (absolute deviation) between each terminal and the clock source signal, which can be used in actual system as a correction parameter to ensure that all terminals are in a fully consistent time reference.

The global clock of the terminals in the system can be effectively achieved even when the signal recording unit is a common timing element. When the device shown in the present disclosure is applied to occasions where the time accuracy is required at a high level, the minimum time measurement scale of the signal recording unit is set to be less than ½ of the clock period of the reference clock source.

As a preferred solution, the signal recording unit includes a controller and a time converter driven by the controller, the minimum measurement scale of the time converter is within ins so that the transmitting time T (0) of the calibration signal and the return time T (n) of the backward signal can be accurately recorded, so that it can be used to the occasions where time accuracy is required at ps level.

Furthermore, the time converter may be a TDC (time-to-digital converter) or a TAC (time-to-analog converter) which has a time accuracy within 100 ps. TDC, for example, read the counting value of TDC (time value recorded) under the control of the controller. Since TDC works by asynchronous timing, that is, the clock signal is instantly triggered, jump edge trigger of electric pulse usually, there is no communication overhead. Furthermore, TDC is able not to rely entirely on the master clock frequency, performs the timing by a circuit delay catch-up circuit, and its timing accuracy can reach 10 ps. Thus, by using the signal recording unit with a time accuracy within 100 ps to record the transmitting time and the return time of the signal, the requirements can be met when the time synchronization accuracy is required at ps level, and thus can be applied to the fields where time accuracy is required at a high level, such as a scanning imaging system.

When the terminal returns the signal in the form of response, if it is used in the general communication field, Δn is predetermined as the response time in the terminals. In order to ensure time accuracy, a signal recording unit is provided in each terminal, the signal recording unit in each terminal also includes a controller and a high-precision time converter which is driven by the controller. When the terminals on the network receive the calibration signal, the signal recording unit in each terminal records the time as $t_{n1}$, and after the terminals send an acknowledgement signal, the signal recording unit in each terminal records the time as $t_{n2}$, and the Δn=tn2−tn1, the Δn value determined by such a method is in the same order of magnitude as T (0) and T (n).

The interaction of the calibration signal (acknowledgement signal) between the signal recording unit cooperating with the clock source and each terminal may be achieved by a single line, and can also by two-way communicative connection. When a single line is used to achieve the signal round-trip, since all the terminals are connected, the signal will be sent by broadcast and both of the signal recording unit and other terminals will receive the signal, thus, the controller of the terminal needs to send a signal (which is preferably different from the calibration signal of the clock source) immediately after it received the signal to avoid that the other terminal mistaken the signal as a signal of the clock source. If the two are connected by two-way communicative connection, the sending and reception of the calibration signal are differentiated, so there is no need to consider this problem, and the sending and reception of signals become easier.

In addition, considering that for the device for providing a global clock in a system of the disclosure, the signal measurement is done to accurately obtain the time delay and deviation of different terminals based on the circuit signal (electrical pulse jump), when the signal is transmitted through a fixed medium, its delay and deviation are more accurately determined. In order to achieve the requirement of the global clock accuracy at the ps level, the connections between the clock source and the signal recording unit, and that between the signal recording unit and the terminal, and that between the terminals are wired connection.

From the above analysis, by using the device for providing a global clock in a system shown in the present disclosure, the setting of the global clock in the system can be realized just by ensuring that each terminal is ultimately communicatively connected to clock source through the signal recording unit, and there is no need to consider the way of connections between the terminals or the length of the connection between the terminal and the clock source. The difficulties in design and implement in traditional methods due to the requirement for precise connection length are solved, and because the absolute deviation between each terminal and the clock source is determined by the signal recording unit which has a time accuracy within 100 ps, it is particularly suitable for occasions where the time accuracy is required at a high level.

The device for providing a global clock in a system shown in the present disclosure will be described below with reference to specific embodiments.

By using the device for providing a global clock in a system shown in the present disclosure, although there is no need to consider the way of setting or connection between the terminals or the length of the connection from each terminal to the clock source, there is still inconvenience during practical operation if the connections are too complicated.

Therefore, in the first embodiment, as shown in FIG. 3, the device for providing a global clock in a system includes: at least one clock source, at least two terminals and a signal recording unit cooperating with the clock source, the signal recording unit and the clock source are connected via paths, and the terminals are connected by two-way communicative connections sequentially to form a linear network; a plurality of linear networks can be arranged in one system, and the signal recording unit is connected to a terminal in each linear network by two-way communicative connection. In the embodiment shown in FIG. 3, it is preferable to provide one linear network, and the signal recording unit is connected with the terminal located at the head by two-way communicative connection. The connections between the clock source and the signal recording unit, and that between the signal recording unit and the terminal located at the head, and that between the terminals are all wired connections.

All the terminals are connected in series through a linear network, and a unique clock source is set at a node (In the embodiment shown in FIG. 3, at one end of the linear network to try to ensure that each terminal are not the in same distance from the clock source.) in the linear network. Meanwhile, a high-precision signal recording unit is also provided. The clock source first sends a calibration signal, at the same time, the signal recording unit of the clock source starts to record as T(0). The terminals will receive the calibration signal sequentially due to the difference in distance from the clock source. When the terminals received the calibration signal, they will response immediately, or return the calibration signal to the signal recording unit of the clock source by directly connect the circuit. Similarly, due to the difference in distance, the signal recording unit will receive the acknowledgement signals from each terminal sequentially, and will record the time T (n) sequentially. When there are n terminals, the delay between each terminal and the clock source is: Delay(n)=(T(n)−T(0))/2 or Delay(n)=(T(n)−T(0)−Δn)/2, the value of Δn being determined by the preceding steps depending on the application. The length of the connections between the terminals and the clock source may be calculated as L(n)=Delay(n)*C, wherein C is the transmission speed of the signal in the line, close to the speed of light. In this way, the absolute time difference for all terminals in the system from the clock source is obtained. When all the terminals of the system are required to have a completely uniform time reference, the timing system of each terminal can be fully synchronized by using the calculated time difference as the correction coefficient.

Taking into account the situation that when multiple linear networks is set in the system there may be multiple terminals being in the same distance from the clock source, in this process, if the number of the acknowledgement signals received by the signal recording unit is less than the terminal value (indicating that there are at least two signals overlap, and this probability is very low, because the signal recording unit can identify two signals when their interval is more than 10 ps), the terminals can be measured in batches and be obtained one by one.

In this way, due to the use of the signal recording unit, the time control accuracy is high, and there is no need to control the length of clock connections and connections in any way are allowed. The amount of cable can be largely reduced, and a global clock can be achieved only by connecting all the terminals in series with a group of connections. It can solve the problem that the system assembly and maintenance become extremely difficult due to a large amount of cable when there are hundreds or thousands of terminals. In addition, if the number of terminals increased, just need to increase the terminal directly in the linear network and increase the connection with the clock at the upper level, the system expansion can be completed conveniently and easily without changing the hardware of the clock source.

Figure 4:
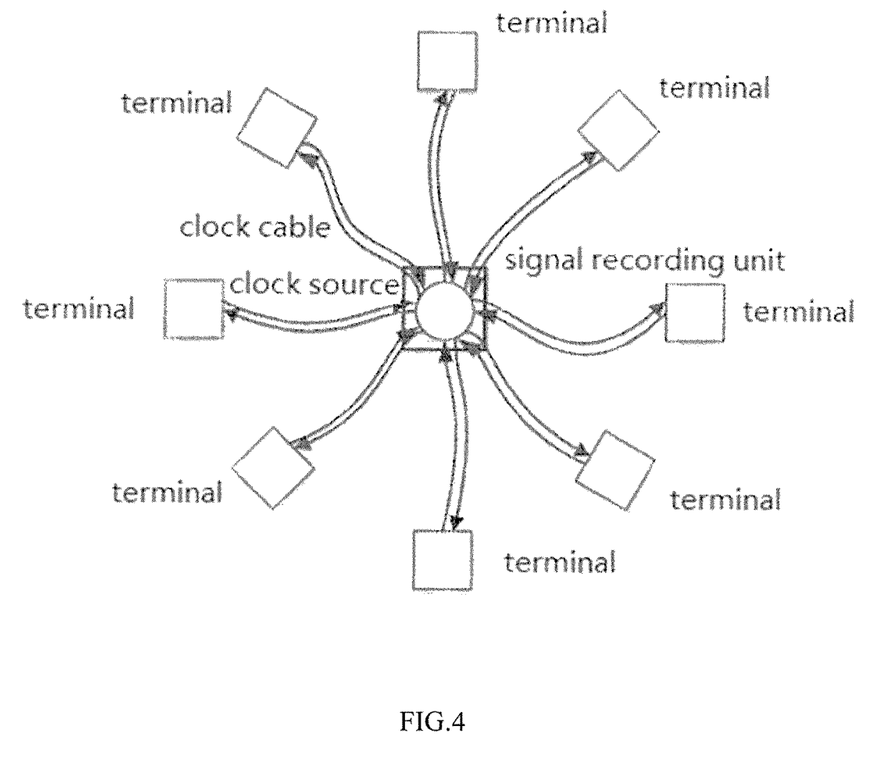
FIG. 4 is a structural schematic diagram of a second embodiment of the device for providing a global clock in a system shown in the present disclosure.

In the second embodiment, as shown in FIG. 4, the device for providing a global clock in a system as shown in the present disclosure includes: at least one clock source, at least two terminals and a signal recording unit cooperating with the clock source, the signal recording unit and the clock source are communicatively connected, and each of the terminals are in two-way communicative connections with the signal recording unit to communicate with the clock source via the signal recording unit. In the present embodiment, a star network connection is still used between the clock source and each terminal, but a signal recording unit is added between the clock source and each terminal, and each terminal is in two-way communicative connections with the signal recording unit. In the present embodiment, preferably, the connections between the clock source and the signal recording unit, and that between the signal recording unit and the terminals are wired connections.

When working, the clock source first sends a calibration signal, at the same time, the signal recording unit starts to record the transmitting time of the calibration signal as T(0), the terminals will receive the calibration signal sequentially due to the difference in distance from the clock source. When the terminals received the signal, they will reply immediately, or return the calibration signal to the signal recording unit of the clock source by directly connect the circuit. Similarly, due to the difference in distance, the signal recording unit will receive the acknowledgement signals from each terminal sequentially, and will record the time T(n) sequentially. When there are n terminals, the time delay between each terminal and the clock source is: Delay(n)=(T(n)−T(0))/2 or Delay(n)=(T(n)−T(0)−Δn)/2, the value of Δn is determined by the preceding steps depending on the application; and the length of the connections between the terminals and the clock source may be calculated as L(n)=Delay (n)*C, wherein C is the transmission speed of the signal in the line, close to the speed of light. In this way, the absolute time difference between all terminals in the system and the clock source is obtained. When all the terminals of the system are required to have a completely uniform time reference, the timing system of each terminal can be fully synchronized by using the calculated time difference as the correction coefficient.

As mentioned above, taking into account the situation that when a star-like network is used there may be multiple terminals being in the same distance from the clock source, in this process, if the number of the acknowledgement signals received by the signal recording unit is less than the terminal value (indicating that there are at least two signals overlap, and this probability is very low, because the signal recording unit can identify two signals when their interval is more than 10 ps), the terminals can be measured in batches and be obtained one by one.

With the device for providing a global clock in a system as shown in the second embodiment, on the one hand, time synchronization accuracy is higher with respect to the prior art; on the other hand, the length of the cable between each terminal and the signal recording unit can be set in any way according to the actual need, and there is no need to control the length of the clock cable, and the wiring is simple and convenient.

The above embodiments have only shown some modes of extrusion of the present disclosure, which is described more specifically and in detail, but it cannot be considered as limit to the scope of the present disclosure. It should be noted that, for those skilled in the art, these embodiments may have various variants and modifications without departing from the present inventive concept, all belong to the protection scope of the present disclosure. Thus, the protection scope of the present disclosure subjects to the attached claims.

The invention claimed is:

1. A method for providing a global clock in a system, the system including at least two terminals which are connected via paths, the method comprising the following steps:
   (1) generating a calibration signal which is then distributed to each terminals in the system, and recording a transmitting time T(0) of the calibration signal;
   (2) receiving a backward signal and recording an arrival time T(n) of the backward signal, the backward signal being generated at each of the terminals upon the arrival of the calibration signal at the each of the terminals, and determining an absolute deviation Delay (n) of the each of the terminals;
   (3) adjusting the time at the each of the terminals according to the absolute deviation to form a global clock; and
   in the step (2), the arrival time T(n) of the acknowledgement signal or the calibration signal is recorded to determine the absolute deviation Delay (n) of each terminal:
   (I) if the return signal is a returned acknowledgement signal, Delay(n)=(T(n)−T(0)−Δn)/2, wherein Δn is a response time of each terminal; and
   (II) if the return signal is a returned calibration signal, Delay(n)=(T(n)−T(0))/2.

2. The method of claim 1, further comprising, before the step (1), the step of determining a clock source to be a reference clock source covering all the terminals.

3. The method of claim 1, wherein the reception and recording for the transmitting time T(0) of the calibration signal and the arrival time T(n) of the backward signal is performed by a signal recording unit cooperating with the reference clock source.

4. A device for implementing the method of claim 1, the device comprising: a reference clock source, at least two terminals channel connected to each other via paths, wherein the device further comprises a signal recording unit cooperating with the clock source, the signal recording unit being connected via paths with the clock source, each of the terminals is in communication with the clock source via the signal recording unit cooperating with the clock source, to determine the absolute deviation in time from each terminal to the clock source.

5. The device of claim 4, wherein the signal recording unit cooperating with the clock source and the terminals are in bidirectional communicative connection;
   the connections between the signal recording unit cooperating with the clock source and the clock source, the connections between the signal recording unit cooperating with the clock source and the terminals, and the connections between the terminals are wired connections; and
   each of the terminals is provided with a signal recording unit to determine the response time of each terminal.

6. The device of claim 4, wherein the terminals are communicatively connected sequentially to form linear network structures, and at least one linear network structure is provided; the signal recording unit cooperating with the clock source is communicatively connected to a terminal in each of the linear network structures.

7. The device of claim 6, wherein the signal recording unit cooperating with the clock source is communicatively connected to the terminal located at the end point in each of the linear network structures;
   the terminals are in bidirectional communicative connections; and
   one linear network is provided.

8. The device of claim 4, wherein each of the terminals is directly communicatively connected to the signal recording unit cooperating with the clock source, respectively, to form a star network structure.

9. The device of claim 4, wherein the minimum time measurement scale of the signal recording unit is less than ½ of the clock period of the reference clock source.

10. The device of claim 5, characterized in that the clock source is a timer control unit, or the clock source comprises a timer control unit and a clock generator being controlled by the timer control unit.

11. The device of claim 4, wherein the signal recording unit comprises a controller, and a time converter communicatively connected to the controller so as to be driven by the controller, the time converter having a time accuracy within 1 ns; or
   the time converter is TDC or TAC with a time accuracy within 100 ps.

12. The method of claim 2, wherein the clock source is a timer control unit, or the clock source comprises a timer control unit and a clock generator being controlled by the timer control unit.

13. The method of claim 12, wherein the calibration signal is formed by an electrical pulse directly generated by the timer control unit, or a clock signal generated by the clock generator driven by the timer control unit.

14. The method of claim 1, wherein in the step (2), the backward signal is an acknowledgement signal transmitted from each of the terminals respectively, or a returned calibration signal.

15. The method of claim 3, wherein in the step (1), the calibration signal is distributed to each terminal in the system by the signal recording unit cooperating with the reference clock source.

16. The method of claim 3, wherein the reference clock source and the signal recording unit cooperating with the reference clock source belong to one of the terminals in the system.

17. The method of claim 3, wherein the minimum time measurement scale of the signal recording unit is less than ½ of the clock period of the reference clock source.

18. The method of claim 3, wherein the minimum time measurement scale of the signal recording unit is within 1 ns.

19. The method of claim 3, wherein the minimum time measurement scale of the signal recording unit is within 100 ps, and in the step (I), $\Delta n$ is system defaults; or $\Delta n$ is determined by the signal recording unit in each terminal, when each of the terminals receives the calibration signal, the signal recording unit in each terminal records the time as $t_{n1}$, when each of the terminals sends an acknowledgement signal respectively, the signal recording unit in each of the terminals records the time as $t_{n2}$, and $\Delta n = t_{n2} - t_{n1}$.

20. The method of claim 3, wherein in the step (3), the absolute deviation of each of the terminals is determined by the signal recording unit or a processor of the terminal or an external processor, and the time at each terminal is adjusted to form a global clock.

* * * * *